3,796,722
1,2-HETEROCYCLIC-1,4-BENZODIAZEPINES
Rodney Ian Fryer, North Caldwell, and Armin Walser, West Caldwell, N.J., assignors to Hoffmann-La Roche Inc., Nutley, N.J.
No Drawing. Filed Oct. 26, 1971, Ser. No. 192,586
Int. Cl. C07d 99/02, 99/10
U.S. Cl. 260—306.7     7 Claims

ABSTRACT OF THE DISCLOSURE

Novel 1,4-benzodiazepine derivatives, bearing between the 1,2-positions a 5-membered heterocyclic ring possessing two hetero atoms, are disclosed. These 1,2-heterocyclic-1,4-benzodiazepines are useful as muscle relaxant anti-convulsant and sedative agents.

DETAILED DESCRIPTION OF THE INVENTION

The present invention relates to 1,2-heterocyclic-1,4-benzodiazepines. More particularly, the invention concerns 1,4-benzodiazepines which bear a 5-membered heterocyclic ring between positions 1- and 2-. The invention further comprehends processes for making these novel benzodiazepines and novel intermediates employed in these processes.

More specifically, the compounds of the present invention are selected from the group consisting of compounds of the general formula

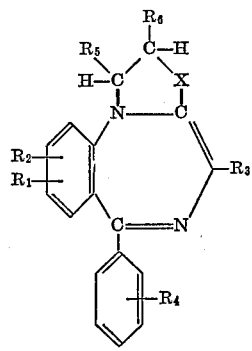

wherein $R_1$ and $R_2$ are each selected from the group consisting of hydrogen, halogen, trifluoromethyl, lower alkyl, lower alkylthio, lower alkyl-sulfinyl lower alkyl-sulfony, cyano, amino, lower alkanoylamino, nitro, di-lower alkylamino, and lower alkoxy; $R_3$ is selected from the group consisting of hydrogen, lower alkyl and lower alkoxycarbonyl; $R_4$ is selected from the group consisting of hydrogen, halogen, trifluoromethyl, lower alkyl, nitro and lower alkoxy; $R_5$ and $R_6$ are each selected from the group consisting of hydrogen, lower alkyl and lower alkoxy; and X is oxygen or sulfur.

As used herein, the term "lower alkyl," either alone or in combination as in lower alkyl-sulfinyl, refers to straight and branched chain hydrocarbon groups containing from 1 to 7, preferably from 1–4 carbon atoms, such as, for example, methyl, ethyl, propyl, isopropyl, t-butyl and the like. The term "halogen" refers to all four forms thereof, i.e., bromine, chlorine, fluorine and iodine. The term "lower alkoxy" comprehends a lower alkyl group having an oxygen function substituted therein, such as methoxy, ethoxy, propoxy, and the like. The term "lower alkanoyl" refers to the acyl residue of lower alkanoic acids, for example, acetyl, propionyl and the like. The term "lower alkylthio" refers to groups such as methylmercapto and the like. The term di-lower alkylamino" refers to groups such as dimethylamino, diethylamino and the like.

A preferred class of compounds falling within the scope of Formula I above are those wherein $R_1$ signifies nitro or halogen, preferably chlorine or iodine, and is located in the 8-position of the benzodiazepine moiety, $R_2$ and $R_3$ are hydrogen and $R_4$ is hydrogen or halogen, preferably chlorine or fluorine, and is located in the 2-position of the 6-phenyl ring, i.e., compounds of the formula

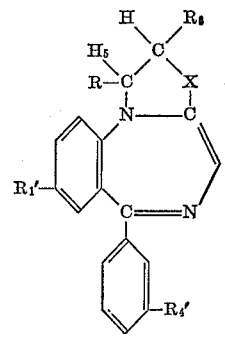

wherein $R_5$, $R_6$ and X are as described above and $R_1'$ signifies nitro or halogen, preferably chlorine or iodine, and $R_4'$ signifies hydrogen or halogen, preferably chlorine or fluorine.

Another preferred class of compounds falling within the scope of Formula I are those wherein X is oxygen, i.e., compounds of the formula

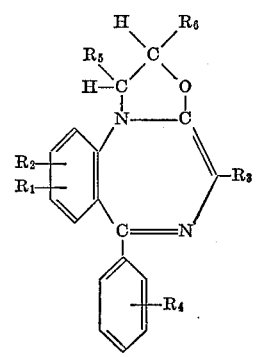

wherein $R_1$–$R_6$ are as described above.

Another preferred aspect of the present invention includes the compounds of Formula I above wherein X is sulfur, i.e., compounds of the formula

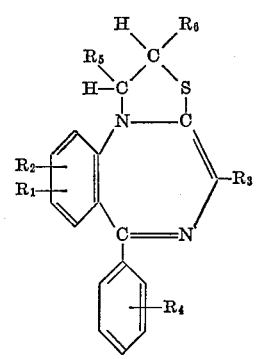

wherein $R_1$–$R_6$ are as described above.

The most preferred compounds of Formula I above are:
8-chloro-6-(2-fluorophenyl)-2-methoxy-1,2-dihydro-thiazolino(3,2-a)-1H-1,4-benzodiazepine;
8-chloro-6-phenyl-2-methoxy-1,2-dihydrothiazolino-(3,2-a)-1H-1,4-benzodiazepine;
8-chloro-1,2-dihydro-6-(2-fluorophenyl)oxazolino-[3,2-a][1,4]-benzodiazepine;
6-(2-fluorophenyl)-8-iodo-1-methoxy-1,2-dihydro-oxazolino[3,2-a][1,4]-benzodiazepine.

The compounds of Formula I above may be prepared by reacting a compound of the formula

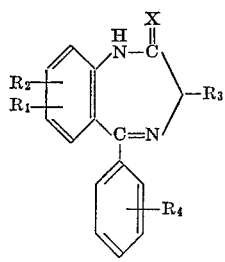

(II)

wherein $R_1$–$R_4$ are as described above with a di-haloethane of the formula

(III)

wherein $R_5$ and $R_6$ are as described above.

The reaction between the compounds of Formulae II and III above is conducted in the presence of an acid acceptor, for example, an organic base such as triethylamine, alkali metal hydrides such as sodium hydride, and alkali metal t-butoxides such as potassium-t-butoxide. This reaction is preferably effected in the presence of an inert organic solvent; suitable solvents for this purpose include dimethylformamide (DMF), tetrahydrofuran (THF), diglyme and the like.

The reaction between the Formulae II and III compounds can be conducted at room temperature or below, with temperatures in the range of from $-40°$ C. to room temperature being preferred. Pressure is not critical to this reaction and thus for the sake of convenience the reaction is effected at atmospheric pressure.

Examples of compounds of Formula III that can be employed in the preparation of the desired end products of Formula I include dichloroethane, dibromoethane, 1,2-dichloro-1-methoxyethane, 1,2 - dichloro-1,2-dimethoxyethane, 1,2-dichloro-1-methoxy-2-methylethane, 1,2-dichloro-1-ethoxyethane and the like.

The starting materials of Formulae II and III above are known compounds or can be prepared in analogy to the preparation of known compounds.

If the reaction between the compounds of Formulae II and III above is effected in the presence of an excess of base, the reaction proceeds directly to the 1,2-heterocyclic benzodiazepines of Formula I above. In an alternate approach, this reaction can be effected in one molar equivalent of base so that the reaction passes through an open intermediate, which can be isolated or which can be cyclized in situ. Thus, for example, if in the starting materials of Formula II, X is oxygen and the reaction of this compound with a compound of Formula III is effected using one molar equivalent of base, there is formed an intermediate of the formula

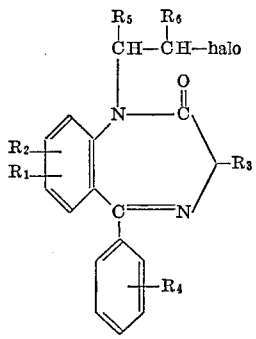

(IV)

wherein $R_1$–$R_6$ are as described above.

The intermediate of Formula IV above is preferably not isolated but intramolecular alkylation of this intermediate to the Formula I compound is effected in situ by the addition of a base to the reaction mixture. Suitable bases include alkali metal hydrides, such as sodium hydride and alkali metal t-butoxides such as potassium t-butoxide. Alternately, the compound of Formula IV can be isolated and then subsequently converted to the compound of Formula I. This conversion is effected by treating the compound of Formula IV, which is preferably dispersed in an inert organic solvent such as DMF, THF, diglyme and the like, with a base such as sodium hydride or potassium t-butoxide.

If, in the starting material of Formula II, X signifies sulfur, and the reaction of this compound and a compound of Formula III is effected using one molar equivalent of base, there is obtained an intermediate of the formula

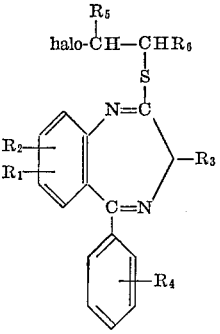

(V)

wherein $R_1$–$R_6$ are as described above.

As discussed above with respect to the intermediate of Formula IV, the compound of Formula V is preferably not isolated but is treated in situ with additional base to yield the compound of Formula I. Suitable bases for this purpose include alkali metal hydrides, such as sodium hydride, and alkali metal t-butoxides, such as potassium t-butoxide. The conversion of the intermediate of Formula V to the corresponding compound of Formula I may be effected at a temperature in the range of from room temperature to 50–60° C.

The compounds of Formula I above are useful as anticonvulsants, muscle relaxants and sedatives. Thus, these compounds can be used as medicaments. For example, they can be used in the form of pharmaceutical preparations which contain them in admixture with a pharmaceutical, organic or inorganic carrier material which is suitable for enteral or parenteral application such as, for example, water, gelatin, lactose, starches, magnesium stearate, talc, vegetable oils, gum arabic, polyalkylene glycols, Vaseline, etc. The pharmaceutical preparations can be prepared in solid form (e.g., as tablets, dragées, suppositories, capsules) or in liquid form (e.g., as solutions, suspensions, or emulsions). They may be sterilized and/or contain additives such as preserving, stabilizing, wetting or emulsifying agents, salts for varying the osmotic pressure or buffers. They can also contain other therapeutically valuable substances.

The compounds of Formula I above can be administered at dosages adjusted to individual requirements and fitted to the pharmaceutical exigences of the situation. Convenient pharmaceutical dosages are in the range of from about 2 mg. to about 200 mg. per day.

The useful anti-convulsant activity of the compounds of this invention is shown in warm-blooded animals utilizing the standard antimetrazole test. In the antimetrazole test, a compound is administered orally to groups of four mice at various dose levels. One hour later, metrazole is administered subcutaneously and the animals are observed for protection from convulsive seizures. Results are recorded as the number of animals protected against convulsions. The dose at which 50% of the animals are protected from convulsive seizures is expressed as the $ED_{50}$. Following these test procedures, compounds such as 8-chloro-2-methoxy-6-phenyl-1,2 - dihydrothiazolino[3,2-a] [1,4]benzodiazepine and 8-chloro-1,2-dihydro-6-(2-fluorophenyl)oxazolino[3,2-a][1,4] - benzodiazepine show and $ED_{50}$ of $27.0\pm4$ and 1.42 mg./kg. respectively, indicating that these compounds exhibit anti-convulsant activity.

The sedative and muscle relaxant activity of the compounds of the invention is shown using the standard foot shock test. In this test, a pair of mice is confined under a one liter beaker placed on a grid which presents shock to the feet. At least 5 fighting episodes are elicited in a 2-minute period. Pairs of mice are marked and pretreated 1 hour prior to a second shocking. Logarithmic dose intervals are utilized up to a maximum of 10 mg./kg. At the 100 percent blocking dose, 3 out of 3 pairs must be blocked from fighting. The measurements are made at the dose level at which 100 percent blocking is observed and the results are expressed as the dose in mg./kg. which block the fighting response for one hour. Following these test procedures, 8-chloro-6-(2-fluorophenyl)-2-methoxy-1,2 - dihydrothiazolino[3,2 - a][1,4]benzodiazepine exhibited a $PD_{50}$ of 10 mg./kg. and 6-(2-fluorophenyl)-8-iodo - 1 - methoxy - 1,2 - dihydrooxazolino[3,2-a][1,4] benzodiazepine exhibited a $PD_{50}$ of 2.5 mg./kg.

The following examples are illustrative of the present invention. All temperatures given are in degrees centigrade.

EXAMPLE 1

Preparation of ethyl 7-chloro-1-(2-chloro-1-methoxyethyl) - 1,3 - dihydro - 5 - phenyl - 2H - 1,4 - benzodiazepin-2-one-3-carboxylate 0.8 g. of sodium hydride suspension (50 percent in mineral oil) is washed with hexane and added to a solution of 3.4 g. of ethyl 7-chloro-1,3-dihydro-5-phenyl-2H-1,4-benzodiazepin-2-one-3-carboxylate in 30 ml. of dimethylformamide cooled to $-10°$. The mixture is stirred under nitrogen for 15 minutes and cooled to $-40°$. 2 g. of 1,2-dichloro-1-methoxyethane is added and the temperature is allowed to rise to $0°$ within 15 min. The mixture is poured over ice/water. The precipitated solid is collected and dissolved in methylene chloride. The solution is dried over sodium sulfate and evaporated. Chromatography of the residue on 70 g. of silica gel (Merck, 70–325 mesh) using 10 percent (v./v.) ethyl acetate in methylene chloride yielded after crystallization of the homogeneous fractions from ethanol the above-named product, M.P. 157–159°.

EXAMPLE 2

Preparation of 1-(2-chloro-1-methoxyethyl)-1,3-dihydro-5 - (2 - fluorophenyl) - 7 - iodo - 2H - 1,4 - benzodiazepin-2-one 7.5 g. of potassium-7-butoxide is added to a solution of 24 g. of 1,3-dihydro-5(2-fluorophenyl)-7-iodo-2H-1,4-benzodiazepin-2-one in 250 ml. of dimethylformamide cooled to $-10°$. After stirring under nitrogen for 5 min., the mixture is cooled to $-30°$. 12 g. of 1,2-dichloro-1-methoxyethane is added and the temperature is allowed to reach $0°$ within 15 min. The product is crystallized by slow addition of 100 ml. of water. It is collected by filtration, is washed with water and ethanol/water. Recrystallization from ethanol/methylene chloride yields the above-named product, M.P. 224–226° (dec.).

EXAMPLE 3

Preparation of 8-chloro-1-methoxy-6-phenyl-1,2-dihydrooxazolino[3,2-a]-1,4-benzodiazepine 0.7 g. of sodium hydride suspension (50 percent suspension in mineral oil) washed with hexane is added to a solution of 3.6 g. of 7-chloro-1-(2-chloro-1-methoxyethyl)-1,3-dihydro-5-phenyl - 2H - 1,4 - benzodiazepin-2-one in 50 ml. of dimethylformamide containing 5 ml. of diethylamine. The reaction mixture is stirred at $0°$ to $10°$ for 15 min. in an atmosphere of nitrogen. After cooling to $-10°$, ice-water is added to the red solution. The precipitated product is collected, washed with water containing 2 percent diethylamine and is dissolved in benzene containing 5 percent triethylamine. The benzene solution is dried over sodium sulfate, dried and evaporated. Crystallization of the residue from benzene/triethylamine yielded the above-named product as deep orange crystals, M.P. 184–186°.

The starting material may be prepared as follows:

27.1 g. of 7-chloro-1,3-dihydro-5-phenyl-2H-1,4-benzodiazepin-2-one with 8 g. of sodium methoxide is reacted with 19.5 g. of 1,2-dichloro-1-methoxy-ethane. After recrystallization from methylene chloride/methanol there is obtained pure 7-chloro-1-[2-chloro-1-methoxy-ethyl]-1,3-dihydro-5-phenyl - 2H - 1,4 - benzodiazepin-2-one, M.P. 152–155°.

EXAMPLE 4

Preparation of 6-(2-fluorophenyl)-8-iodo-1-methoxy-1,2-dihydrooxazolino[3,2-a] 1,4-benzodiazepine 1 g. of sodium hydride suspension (50 percent in mineral oil) is washed with hexane and added to 4.7 g. of 1-(2-chloro - 1 - methoxyethyl)-1,3-dihydro-5-(2-fluorophenyl)-7-iodo-2H-1,4-benzodiazepin - 2 - one in 50 ml. of dimethylformamide containing 3 ml. of diethylamine. The mixture is stirred at $0°$ to $3°$ for 30 min. under nitrogen. After cooling to $-10°$ water is added. The precipitated crystals are collected, washed with water containing 2 percent diethylamine and dried in vacuum to yield the above-named product. Recrystallization from ether/diethylamine gives red crystals with M.P. 170–172°.

EXAMPLE 5

Preparation of ethyl 8-chloro-1-methoxy-6-phenyl-1,2-dihydrooxazolino[3,2-a]-1,4-benzodiazepine-4-carboxylate A solution of 1.1 g. of ethyl 7-chloro-1-(2-chloro-1-methoxyethyl) - 1,3 - dihydro-5-phenyl-2H-1,4-benzodiazepin-2-one-3-carboxylate in 15 ml. of dimethylformamide containing 0.5 ml. of triethylamine is cooled to $-20°$ with stirring under nitrogen. 0.5 g. of sodium hydride suspension (50 percent in mineral oil) is washed with hexane and is added. After stirring for 1 hr. at $-20°$ to $-15°$, the reaction mixture is poured into ice-water. The precipitated orange solid is filtered, washed with water and dissolved in benzene. The solution is dried over sodium sulfate and evaporated. Crystallization of the residue from ether/hexane yields the above-named product as yellow crystals, M.P. 215–217°. Recrystallization from benzene gives a solvent containing modification melting at 200–203°, resolidifying and M.P. at 220–223°.

EXAMPLE 6

Preparation of 8-chloro-1,2-dihydro-6-(2-fluorophenyl)-oxazolino[3,2-a]1,4-benzodiazepine 1 g. of sodium hydride suspension (50 percent in mineral oil) is washed with hexane and is added to a solution of 2.7 g. of 7-chloro-1-(2-chloroethyl)-1,3-dihydro-5-(2-fluorophenyl)-2H-1,4-benzodiazepin-2-one in 50 ml. of dimethylformamide containing 2 ml. of diethylamine. The mixture is stirred at $-5°$ to $0°$ for 30 min. and is then poured into ice-water. The precipitate is collected by filtration, is washed with water containing 2 percent diethylamine and is dissolved in benzene containing 5 percent triethylamine. The red benzene solution is dried over sodium sulfate and evaporated. The residue is crystallized from ether/hexane/triethylamine to yield the above-named product, M.P. 170–175°.

The starting material may be prepared as follows:

A solution of 0.5 g. of 7-chloro-5-(2-fluorophenyl)-1,3- dihydro-1-(2-hydroxyethyl)-2H-1,4-benzodiazepin-2-one in 25 ml. of absolute ethanol was treated with 9 ml. of a 7.8 N solution of hydrogen chloride in ethanol and heated under reflux for 4 hr. After standing overnight at room temperature, solvent was removed and the residue was partitioned between dilute ammonium hydroxide and dichloromethane. The layers were separated and the organic layer was washed with water, dried over anhydrous sodium sulfate and evaporated. Crystallization from ether gave 7-chloro-1-(2-chloroethyl)-5-(2-fluorophenyl)-1,3-dihydro-2H-1,4-benzodiazepin-2-one as white prisms, M.P. 111–114°.

EXAMPLE 7

Preparation of 8-chloro-2-methoxy-6-phenyl-1,2-dihydrothiazolino[3,2-a][1,4]-benzodiazepine A solution of 29 g. (0.1 mol) of 7-chloro-1,3-dihydro-5-phenyl-2H-1,4-benzodiazepin-2-thione in 300 ml. of dimethylformamide was cooled to −10°. Potassium t-butoxide (13 g. or 0.115 mol) was added with stirring under nitrogen. After 5 min., the temperature was lowered to −35° and 16 g. (0.125 mol) of 1,2-dichloro-1-methoxyethane was added. Cooling was discontinued. When the temperature of the reaction mixture had reached −10°, 7.5 g. of a 50% suspension of sodium hydride in mineral oil was added and stirring was continued for 15 min. at room temperature. The red mixture was again cooled to −10° and diluted with water. The precipitated product was collected, washed with water containing 5% diethylamine and was dissolved in benzene. The solution was dried and evaporated. Crystallization of the residue from ether yielded the above-named product, M.P. 197–200°. Recrystallization from benzene/hexane twice yielded the pure product, M.P. 200–203°.

EXAMPLE 8

Preparation of 8-chloro-6-(2-fluorophenyl)-2-methoxy-1,2-dihydrothiazolino[3,2-a][1,4]benzodiazepine Following the procedure set forth in Example 7 above, 6.1 g. (0.02 mol) of 7-chloro-1,3-dihydro-5-(2-fluorophenyl)-2H-1,4-benzodiazepin-2-thione was reacted with 2.6 g. (0.023 mol) of potassium t-butoxide, 3.2 g. (0.025 mol) of 1,2-dichloro-1-methoxyethane and 1.5 g. of a 50% suspension of sodium hydride in mineral oil to yield crude product as a red oil. It was chromatographed on 200 g. of silica gel which had been treated with a mixture of 20% diethylamine in hexane. Elution with benzene:hexane 2:3 afforded the above-named product in pure form crystallized from benzene/hexane, M.P. 100–104°.

EXAMPLE 9

Preparation of 8-chloro-6-(2-fluorophenyl)-1,2-dihydrothiazolino[3,2-a][1,4]benzodiazepine 1.3 g. potassium t-butoxide was added to a solution of 3 g. of 7-chloro-1,3-dihydro-5-(2-fluorophenyl)-2H-1,4-benzodiazepin-2-thione in 30 ml. of dry dimethylformamide cooled to −10°. After stirring for 10 min. under nitrogen, 2.1 g. of 1,2-dibromoethane was added, followed by 0.75 g. of a 50% sodium hydride suspension in mineral oil. The mixture was stirred at room temperature for 16 hours. The crude product was precipitated by addition of water, was collected and dissolved in benzene containing 2% of diethylamine. The solution was dried over sodium sulfate and evaporated. The red residue obtained was chromatographed on 60 g. of silica gel (Merck, 70–325 mesh) which had been equilibrated with diethylamine in hexane. The homogenous fractions eluated with benzene:ether 1:1 (v./v.) were combined and evaporated. Crystallization of the residue from ether/hexane yielded the above-named product, M.P. 145–148°.

EXAMPLE 10

Pharmaceutical formulations using 8-chloro-1,2-dihydro-6-(2-fluorophenyl)oxazolino[3,2-a][1,4]benzodiazepine as the active ingredient:

Suppository formulation

| | Per 1.3 gm. Suppository, gm. |
|---|---|
| 8-chloro-1,2-dihydro-6-(2-fluorophenyl)oxazolino[3,2-a][1,4]benzodiazepine | 0.010 |
| Wecobee M [1] | 1.245 |
| Carnauba wax | 0.045 |

[1] E. F. Drew Company, 522 5th Ave., New York, N.Y.

Procedure (1) The Wecobee M and the carnauba wax were melted in a suitable size glass-lined container (stainless steel may also be used), mixed well and cooled to 45° C.

(2) The 8-chloro-1,2-dihydro-6-(2-fluorophenyl)oxazolino[3,2-a][1,4]benzodiazepine which had been reduced to a fine powder with no lumps, was added and stirred until completely and uniformly dispersed.

(3) The mixture was poured into suppository molds to yield suppositories having an individual weight of 1.3 grams.

(4) The suppositories were cooled and removed from molds. They were then individually wrapped in wax paper for packaging (foil may also be used).

Capsule formulation

| | Per capsule, mg. |
|---|---|
| 8-chloro-1,2-dihydro-6-(2-fluorophenyl)-oxazolino[3,2-a][1,4]benzodiazepine | 10 |
| Lactose, U.S.P. | 165 |
| Corn starch, U.S.P. | 30 |
| Talc, U.S.P. | 5 |
| Total weight | 210 |

Procedure (1) 8-chloro-1,2-dihydro-6-(2-fluorophenyl)oxazolino[3,2-a][1,4]benzodiazepine, lactose and corn starch were mixed in a suitable manner.

(2) The mixture was further blended by passing through a Fitzpatrick comminuting machine with a No. 1A screen with knives forward.

(3) The blended powder was returned to the mixer, the talc added and blended thoroughly.

(4) The mixture was filled into No. 4 hard shell gelatin capsules on a Parke Davis capsulating machine. (Any similar type capsulating machine may be used.)

Tablet formulation

| | Per tablet, mg. |
|---|---|
| 8-chloro-1,2-dihydro-6-(2-fluorophenyl)-oxazolino[3,2-a][1,4]benzodiazepine | 25.00 |
| Dicalcium phosphate dihydrate, unmilled | 175.00 |
| Corn starch | 24.00 |
| Magnesium stearate | 1.00 |
| Total weight | 225.00 |

Procedure (1) 8-chloro-1,2-dihydro-6-(2-fluorophenyl)-oxazolino[3,2-a][1,4]benzodiazepine and corn starch were mixed together and passed through a No. 00 screen in Model "J" Fitzmill with hammers forward.

(2) This premix was then mixed with dicalcium phosphate and one-half of the magnesium stearate, passed through a No. 1A screen in Model "J" Fitzmill with knives forward, and slugged.

(3) The slugs were passed through a No. 2A plate in a Model "D" Fitzmill at slow speed with knives forward, and the remaining magnesium stearate was added.

(4) The mixture was mixed and compressed.

Parenteral formulation

| | |
|---|---|
| 8-chloro-1,2-dihydro-6-(2 - fluorophenyl) - oxazolino[3,2-a][1,4]benzodiazepine _____mg./ml__ | 5 |
| Propylene glycol _____ml__ | 0.4 |
| Benzyl alcohol _____ml__ | 0.015 |
| Ethanol, U.S.P. _____ml__ | 0.105 |
| Water for injection, q.s. to 1 ml. | |
| Sodium acetate _____mg./ml__ | 1.4 |
| Acetic acid glacial _____mg./ml__ | 0.6 |

Procedure (1) Dissolve 8-chloro-1,2-dihydro-6-(2 - fluorophenyl)-oxazolino[3,2-a][1,4]benzodiazepine in 15 ml. of benzyl alcohol.

(2) Add 400 ml. propylene glycol and 105 ml. of ethanol.

(3) Add sodium acetate and acetic acid previously dissolved in water for injection.

(4) Add sufficient water for injection to bring volume to 1,000 ml.

(5) Filter through No. 02 Selas candle, fill into glass ampuls, gas with nitrogen and seal.

(6) Autoclave at 10 p.s.i. for 30 minutes.

EXAMPLE 11

In analogy to the procedures described in Example 10 above, capsule, tablet, suppository and parenteral formulations can be prepared wherein 8-chloro-6 - (2 - fluorophenyl)-2-methoxy-1,2 - dihydrothiazolino[3,2 - a][1,4] benzodiazepine is the active ingredient.

What is claimed is:
1. A compound of the formula

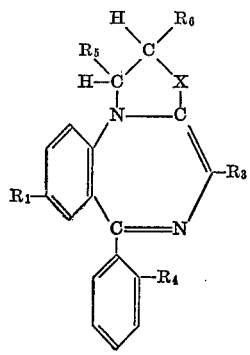

wherein $R_1$ signifies amino, halogen, or nitro; $R_3$ signifies hydrogen, lower alkyl, or lower alkoxy-carbonyl; $R_4$ signifies hydrogen or halogen; $R_5$ and $R_6$ are each selected from the group consisting of hydrogen, lower alkyl and lower alkoxy; and X is oxygen or sulfur.

2. A compound of claim 1 wherein X is sulfur.

3. The compound of claim 2 of the formula 8-chloro-6-(2-fluorophenyl)-2-methoxy - 1,2 - dihydrothiazolino-(3,2-a)-1H-1,4-benzodiazepine.

4. The compound of claim 2 of the formula 8-chloro-6-phenyl-2-methoxy-1,2-dihydrothiazolino(3,2 - a) - 1H-1,4-benzodiazepine.

5. A compound of claim 1 wherein X is oxygen.

6. The compound of claim 5 of the formula 8-chloro-1,2-dihydro-6 - (2 - fluorophenyl)oxazolino[3,2 - a][1,4] benzodiazepine.

7. The compound of claim 5 of the formula 6-(2-fluorophenyl)-8-iodo-1-methoxy-1,2-dihydrooxazolino[3,2 - a]-[1,4]benzodiazepine.

References Cited
UNITED STATES PATENTS
| | | | |
|---|---|---|---|
| 3,523,947 | 8/1970 | Derieg et al. | 260—256.4 |
| 3,678,036 | 7/1972 | Archer et al. | 260—239 BD |

OTHER REFERENCES

Derieg et al.: Chem. Abstracts, vol. 73, Abstract No. 25,542y (1970).

ALTON D. ROLLINS, Primary Examiner

U.S. Cl. X.R.

260—239.3 D, 307 F; 424—270, 272